Dec. 8, 1925.
J. A. MAY
1,564,435
FILM WINDING AND STOP MECHANISM
Filed March 24, 1922   2 Sheets-Sheet 1
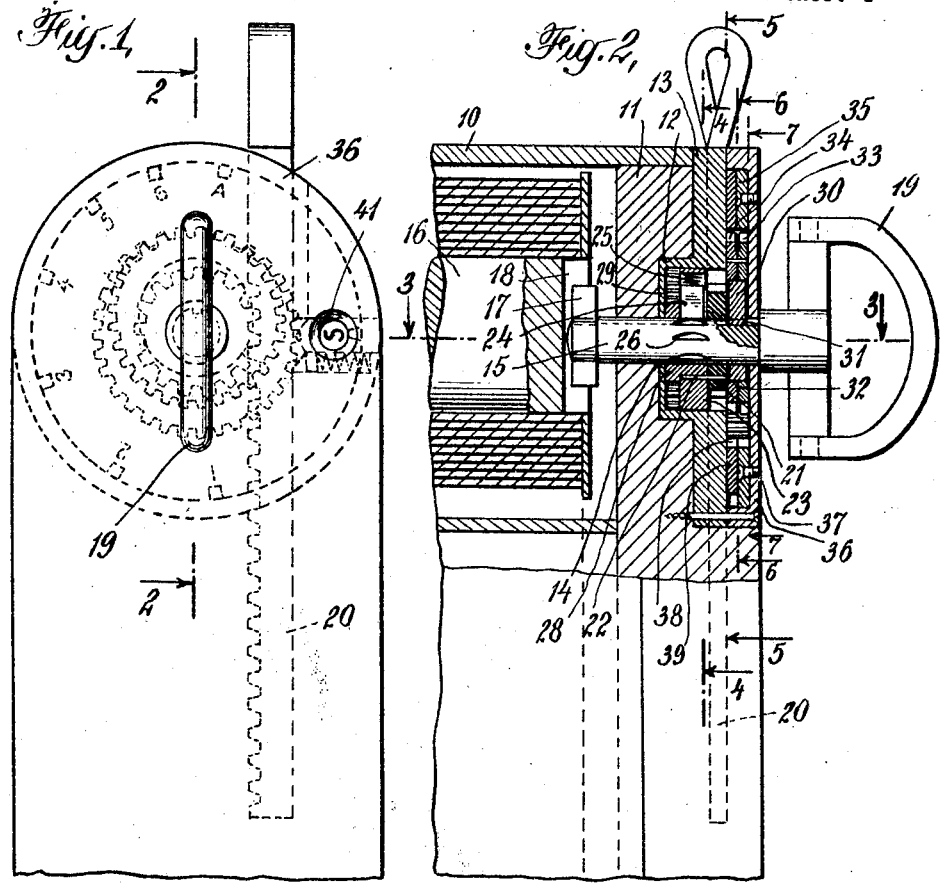
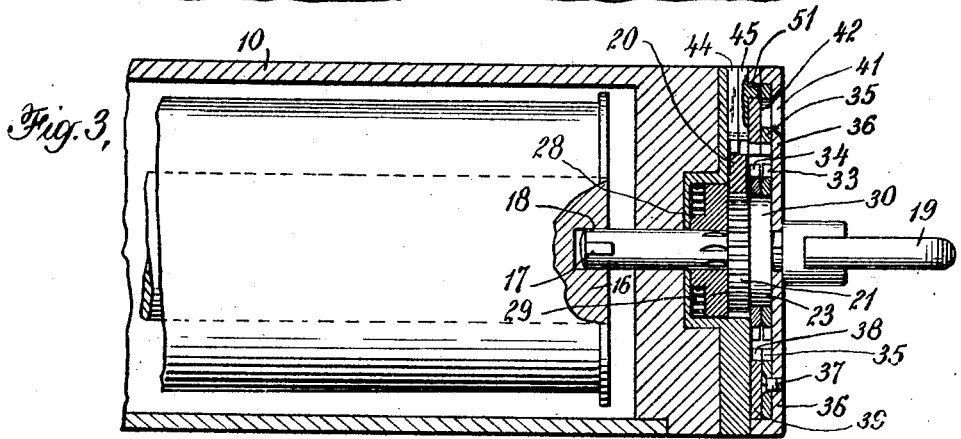
Inventor
James A. May
By his Attorney
E. W. Marshall Dec. 8, 1925.  1,564,435
J. A. MAY
FILM WINDING AND STOP MECHANISM
Filed March 24, 1922  2 Sheets-Sheet 2

Inventor
James A. May
By his Attorney

Patented Dec. 8, 1925.

1,564,435

UNITED STATES PATENT OFFICE.

JAMES A. MAY, OF ASTORIA, NEW YORK.

FILM WINDING AND STOP MECHANISM.

Application filed March 24, 1922. Serial No. 546,256.

*To all whom it may concern:*

Be it known that I, JAMES A. MAY, a citizen of the United States, and a resident of Astoria, county of Queens, and State of New York, have invented certain new and useful Improvements in Film Winding and Stop Mechanism, of which the following is a specification.

This invention relates to mechanism for winding films and for arresting the movement thereof at predetermined intervals.

As a film is wound on the take-up spool of the camera the diameter of the spool increases and therefore the amount of rotation of the spool necessary to wind up a predetermined length of film varies by decreasing amounts with the increase in diameter.

One of the objects of the invention is to provide film feeding mechanism so constructed and arranged as to feed a predetermined length of film such, for instance, as one exposure, and to automatically arrest the feed when such a length of film has been fed or taken up.

Another object of the invention is to provide automatic stop mechanism adapted to arrest the rotation of a film take-up spool when a predetermined length of film has been wound thereon.

Another object of the invention is to provide film feeding or take up mechanism so constructed and arranged as to be independently operable by a plurality of different actuating means.

Another object of the invention is to provide in a camera means for indicating the number of the exposure without subjecting the film to light and without the use of a window or opening adjacent the film or film lining paper.

Further objects of the invention will appear from the following specification taken in connection with the drawings which form a part of this application and in which, Fig. 1 is a side elevation of one side of a camera having film feeding and stop mechanism constructed in accordance with the invention.

Fig. 2 is a sectional elevation of the construction shown in Fig. 1 taken substantially on line 2—2 of Fig. 1.

Fig. 3 is a horizontal section taken substantially on line 3—3 of Fig. 2.

Figure 5:
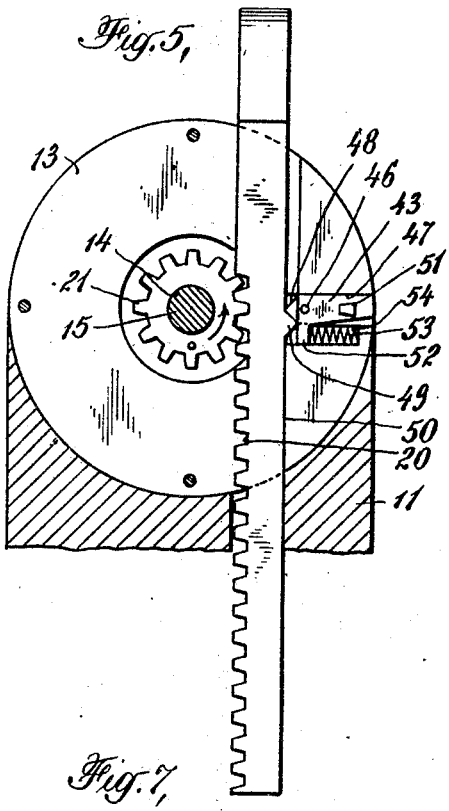
Figure 6:
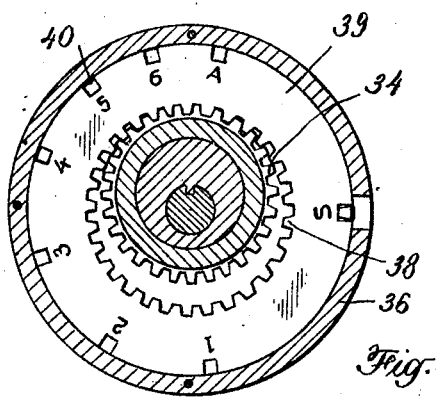
Figure 7:
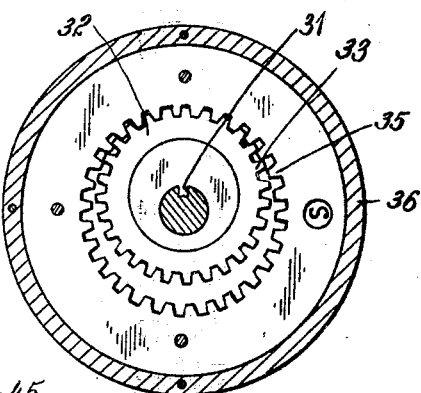
Figure 8:
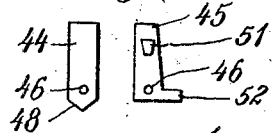

Figs 5, 6 and 7 are sectional elevations taken respectively on lines 5—5, 6—6 and 7—7 of Fig. 2, and Fig. 8 is a detail elevation showing the stop pawl construction.

The invention briefly described consists in utilizing an epicyclic gear train for connecting the rotating means for rotating a take up spool and stop mechanism for controlling the rotation of said spool. By utilizing an epicyclic gear train in which the gearing elements are grouped around a spindle and are thus compactly arranged, a structure is provided that can be installed in a minimum amount of space.

In the particular embodiment of the invention illustrated the film feeding and arresting or stop mechanism constructed in accordance with the invention, comprises mechanism adapted to attachment to any standard camera. This mechanism includes means for rotating the usual winding stem which is keyed or otherwise connected to the take up spool of the camera. This rotating means, in the present instance, comprises a rack and pinion, the rack being the actuating member and pinion being pinned to a disc having a pawl engaging ratchet teeth on the winding stem. The winding stem also has keyed thereto means for rotating a stop disc and in the embodiment of the invention illustrated the disc consists of an annular or ring gear which has notches in its periphery adapted to coact with a stop lug and arrest the rotation of the disc and therefore of the stem when predetermined lengths of film have been taken up by the spool. Attention is particularly called to the fact that the description "predetermined length" as used throughout this specification and the claims is intended to indicate the length of film necessary for an exposure in the camera and, of course, it is understood that all of the exposures on a film utilize substantially the same length thereof within reasonable limits. It will be evident that the rotation of the stem and spool must be stepped down by suitable means to cause a relatively slight rotation of the disc and this has been accomplished as above stated by means of epicyclic gearing, the details of which will be hereinafter explained.

As illustrated in the drawings, the mechanism is secured to one of the side edges of a standard camera having a casing or cover 10 and side frame members 11 which may be formed of wood or any other suitable material. As shown in Fig. 2 the frame member 11 is recessed at 12 to receive the feeding and stop mechanism. This mechanism has a base plate 13 having a central aperture 14 through which extends the winding stem 15 for the take up spool 16. The winding stem has secured to its inner end a cross bar 17 which seats in a correspondingly shaped opening 18 in one end of the spool. A handle 19 is secured to the outer end of the stem 15 for manually rotating this stem when desired.

Figure 4:
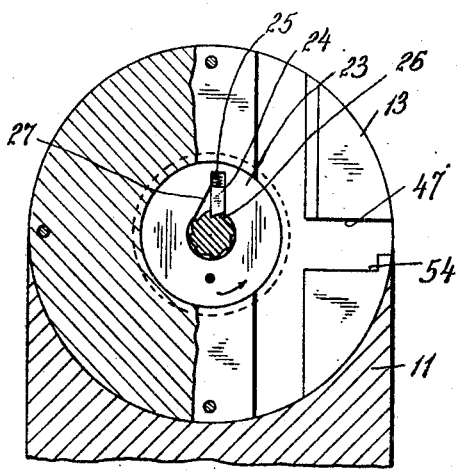
Fig. 4 is a sectional elevation taken substantially on line 4—4 of Fig. 2.

The stem 15 may also be rotated by means of a rack 20 and pinion 21, the pinion being pinned as shown at 22 to a disc 23 having a pawl 24 slidable therein and actuated by spring 25. The pawl 24 engages ratchet teeth 26 formed on the stem 15. As shown in Fig. 4 the recess in the disc 23 in which the pawl 24 is slidably mounted is cut away at one side forming an inclined wall 27 to permit a slight lateral movement of the pawl under conditions hereinafter described. Thus the actuation of the rack will rotate the pinion and the disc 23 which is secured to the pinion and the rotation of the disc will also by reason of the engagement of the pawl 24 with the teeth 26, rotate the stem.

In order to retract the rack 20 the disc 23 is recessed on its inner face and provided with a hub 28 and a flat coiled spring 29 is positioned in the recess and has one end secured to the hub and its opposite end secured to the casing of the base plate 12.

It should be understood that any other form of actuating means may be used if desired and that the rack and pinion mechanism has been illustrated merely for the purpose of showing one practical embodiment of the invention.

The mechanism by means of which the film feed is arrested will now be described. As shown in Figs. 2, 6 and 7 an eccentric disc 30 is keyed at 31 to the stem 15 and is therefore rotated by the stem. A sectional gear 32 is mounted on the eccentric as shown particularly in Figs. 2 and 3 and this gear comprises a pair of gears 33 and 34 which are secured against relative rotation and one of which has one more tooth than the other. The gear 33 meshes with an annular or ring gear 35 which is secured to the casing cover 36 by means of screws 37. The ring gear 35 therefore is fixed against rotation. The other gear 34 meshes with an annular gear 38 formed on a stop disc 39.

The disc 39 has formed in its periphery a plurality of notches 40 and in the embodiment of the invention shown eight notches are provided, six of the notches being provided for the six exposures on the film and being indicated by the numerals 1—6 respectively and the other two notches being indicated by A and S. The notch A is provided for stopping the film in position to be autographed in autographic cameras and the notch S being provided for the starting point.

As illustrated in Fig. 3 openings 41 and 42 are provided respectively in the cover plate 36 and in the body portion of the ring gear 35, to render visible to the operator the numbers and other indicia on the stop disc 39.

In order to cooperate with the disc 39 and to stop the film when one length has been fed I have provided a pawl 43, this pawl as shown in Figs. 5 and 8 being formed in two parts 44, and 45 pivoted together as shown at 46. These parts are slidably mounted in a recess 47 formed in the base plate 13 and the part 44 has a tooth 48 at its inner end disposed in the path of a corresponding tooth 49 formed on the outer edge 50 of the rack 20. The part 45 has formed on its outer face a laterally projecting lug 51 adapted to seat in any one of the notches 40. The part 45 also has an offset lug 52 formed thereon and engaged by spring 53 which is seated in a recess 54 formed in the plate 13. It will be evident that when the lug 51 is seated in one of the notches of the disc 39 no further rotation of this disc is permitted. Attention is called to the inclined side edges of the lug 51 which facilitate the movement of the lug into and out of the notches 40. The pawl mechanism just described operates as follows.

When the rack 20 is raised from the position shown in Fig. 5 the tooth 49 on the rack will engage the tooth 48 of the pawl and force the lug 51 out of the notch in which it is seated. Thereupon the spring 53 will swing the portion 45 in the pawl about the pivot 46 thereby positioning the lug 51 on the outer periphery of the disc 39. It will thus be seen that the spring 53 performs two functions, namely, seating the lug 51 in its notch when the pawl is moved inwardly and swinging the portion 45 of the pawl laterally when the lug is moved out of the notch. This construction last described is important for the reasons hereinafter pointed out.

The operation of the feeding and stop mechanism above described will now be outlined.

In order to place an empty take up spool in the camera and to secure the end of an unexposed film thereto the stem 15 is pulled out in the usual manner. This is made possible by the key or spline connection 31 of the stem to the disc 30 and also at this time the pawl 24 will ride out of the teeth 26 formed on the stem. When a new film has been secured to the spool, the lug 51 will be disposed either on the periphery of the stop disc or will be located in the notch S. If the lug is on the periphery of the disc, the spool may be rotated, by the handle 19 or by rack 20. If the disc is locked, a slight pull on the rack will release the lug after which the film may be wound on the spool. The release of the lug from the notch may be explained thus.

Because of the fact that the stem 15 is keyed or splined to the eccentric disc 30 and of the geared connection between the gears 33 and 34 carried by the eccentric 30 and the fixed ring gear 35 and gear 38 of the disc 39, it will be evident that the stem 15 can not be rotated until the lug 51 is freed from the notch engaged thereby but that the pawl disc 23 and pawl 24 must rotate with the pinion 21 to which the pawl disc is pinned. Therefore to permit relative movement between the pawl disc and pawl 24 and the stem 15 engaged by the pawl, the recess in the pawl disc in which the pawl is positioned, is cut away as shown at 27. When the lug 51 has been freed from the notch 8 the spool can again be rotated therefore by the rack 20 or by hand until the lug 51 automatically snaps into the notch 1.

The first exposure of the film is then in the proper position. After this portion of the film has been exposed the rack 20 is actuated and is drawn out until the lug 51 snaps into the notch 2. Upon the release of the rack the spring 29 will retract the rack to its inner position. When the rack is so retracted the tooth 49 on the rack will engage tooth 48 on the pawl and force the pawl outwardly moving the lug 51 out of the notch of the disc. The pawl will also swing on its pivot, positioning the pawl lug 51 on the outer periphery of the disc.

The gearing is so proportioned that the distances between the respective notches on the periphery of the disc 39 correspond to the predetermined lengths of film necessary for the successive exposures and in the embodiment illustrated the gearing gives a ratio of approximately 28 turns of the stem 15 to one turn of the disc 39.

As the disc is stopped by the lug 51 the indicia adjacent the notch engaged by the lug is visible through the openings 41 and 42 thereby enabling the operator to determine how many exposures have been taken and how much of the film has been wound up.

It will thus be seen that a simple, practical and compact film winding and stop mechanism has been provided and that the film may be wound at any time either by the actuation of the rack 20 or by the handle 19. It will also be noted that the stop mechanism is positive and will automatically arrest the feeding of the film at the proper point. It will also be clear that the rack and pinion feed will effect a very rapid or quick take up of the film.

Although one specific embodiment of the invention has been particularly shown and described, it will be understood that the invention is capable of modification and that changes in the construction and in the arrangement of the various cooperating parts may be made without departing from the spirit or scope of the invention as expressed in the following claims.

What I claim is:—

1. In a camera, a film take up spool, means for rotating said spool, means for arresting the rotation of the spool when a length of film such as that length sufficient for an exposure has been wound up and epicyclic gearing connecting said rotating means and said arresting means.

2. In a camera, a film take up, spool means for rotating said spool, means including a stop disc for arresting the rotation of the spool when a length such as the length sufficient for one exposure of the film has been wound up and epicyclic gearing connecting said rotating means and said arresting means.

3. In a camera, a take up spool, a spindle connected thereto, means for rotating the spindle, an eccentric driven by the spindle, and means including a stop disc driven by the eccentric for automatically arresting the rotation of the spindle when lengths of the film such as the lengths required for successive exposures have been wound on the spool.

4. In a camera, a film take up spool, means for rotating said spool, means including a stop disc for arresting the rotation of the spool when a length of film such as the length of film sufficient for one exposure has been wound up, epicyclic gearing connecting said rotating means and said arresting means, and a pawl adapted to coact with said disc to stop the rotation of the disc and spool.

5. In film feeding mechanism, a take up spool, a stem connected thereto, a plurality of independently operable means for rotating said take up spool, and means driven by and surrounding said stem for automatically arresting the rotation of the spool when lengths of film such as the lengths required for successive exposures have been wound thereon.

6. In film feeding mechanism, a take up spool, a stem connected thereto, a plurality of independently operable means for rotating said take up spool, means driven by said stem for automatically arresting the rotation of the spool when lengths of film such as the lengths required for successive exposures have been wound thereon, and epicyclic gearing connecting the stem and arresting means.

7. In a camera, film winding mechanism including an actuating member and automatic stop mechanism for locking the winding mechanism comprising a disc driven by the winding mechanism and having notches therein, a pawl engageable with said notches and means carried by the actuating member for releasing the pawl to permit the operation of the winding mechanism.

8. In a camera, film winding mechanism including a plurality of independently operable actuating members and automatic stop mechanism for locking the winding mechanism comprising a disc driven by the winding mechanism and having notches therein, a pawl engageable with said notches and means carried by one of the actuating members for releasing the pawl to permit the operation of the winding mechanism by either of the actuating members.

9. In a camera, film winding mechanism including a plurality of independently operable actuating members, means for automatically locking said winding mechanism when lengths of film such as the lengths required for successive exposures have been wound and means controlled by one of said actuating members for releasing said locking means and rendering the winding mechanism operable by either of said actuating members.

10. Film feeding mechanism including a take up spool, a spindle secured thereto, means for rotating said spindle and means, including a notched disc operatively connected through an epicyclic gear train to said spindle and a pawl engageable with the notches in the disc for automatically arresting the operation of the rotating means when a length of film such as the length required for one exposure has been wound on the take up spool.

11. Film feeding mechanism including a take up spool, a spindle secured thereto, means including an actuating member for rotating said spindle and means including a notched disc driven by said spindle, and a pawl engageable with the notches in the disc, for automatically arresting the operation of the rotating means when a length of film such as the length required for one exposure has been wound on the take up spool, and means carried by the actuating member for releasing the pawl from locking engagement with the disc.

12. Film winding mechanism including a take up roll, a spindle secured thereto, means for rotating the spindle, a stop disc, an eccentric secured to the spindle, differential gearing carried by said eccentric and comprising a pair of gears, a fixed ring gear meshing with one of said pair of gears and a ring gear carried by the disc meshing with the other gear of said pair of gears, and means engageable with said disc at predetermined points in the rotation thereof for arresting the rotation of the disc.

13. In a camera, film winding mechanism, including an actuating member, automatic stop mechanism for arresting the winding mechanism comprising a disc having notches therein, epicyclic gearing operatively connecting said winding mechanism and said disc, a pawl engageable with the notches in the disc and means for releasing said pawl to permit the operation of the winding mechanism.

14. Film winding mechanism including a take up roll, a spindle secured thereto, means for rotating the spindle, a stop disc, an eccentric secured to the spindle, differential gearing carried by said eccentric and comprising a pair of gears, a fixed gear meshing with one of said pair of gears and a gear carried by the disc meshing with the other gear of said pair of gears, and means engageable with said disc at predetermined points in the rotation thereof for arresting the rotation of the disc.

15. In a camera, a take up spool, a spindle connected thereto, means for rotating said spindle and means surrounding and driven by the spindle for automatically arresting the rotation of the spindle when lengths of film have been wound on the spool such as the lengths required for successive exposures.

16. In a camera, a film take up spool, means including an actuating member for rotating said spool, means including a notched stop disc for arresting the rotation of the spool when one exposure of film has been wound thereon, a pawl adapted to engage the notches in said disc and means controlled by the operative movement of the actuating member for releasing the pawl from a notch in the disc.

17. In a camera, a film take up spool, rotating means therefor, means including a stop disc having peripheral notches therein for arresting the rotation of the spool and a pawl having a surface disposed against one flat surface of said disc and a lug offset from said surface and adapted to enter the notches of the disc to arrest the rotation thereof.

18. In a camera, a film take up spool, rotating means therefor including an actuating member, means including a stop disc having peripheral notches therein for arresting the rotation of the spool and a pawl having a surface disposed against one flat surface of said disc and a lug offset from said surface and adapted to enter the notches of the disc to arrest the rotation thereof, and means operative upon the movement of the actuating member to rotate the take up spool for retracting the pawl from a notch in said disc.

19. In a camera, a film take up spool, rotating means therefor including an actuating member, means including a stop disc having peripheral notches therein for arresting the rotation of the spool and a pawl having a surface disposed against one flat surface of said disc and a lug offset from said surface and adapted to enter the notches of the disc to arrest the rotation thereof and means on said actuating member for retracting the pawl from a notch in said disc.

20. In a camera, a film take up spool, rotating means therefor, means including a stop disc having peripheral notches therein for arresting the rotation of the spool and a pawl having a surface disposed against one flat surface of said disc and a lug offset from said surface and adapted to enter the notches of the disc to arrest the rotation thereof, the side edges of the lug converging toward the axis of the disc.

21. In a camera, a film take up spool, an actuating member, operative driving connections between said member and said spool, means for arresting the rotation of the spool including a stop disc and a pawl engageable therewith, means on said actuating member for disengaging the pawl from the disc and spring means for retracting said actuating member.

22. In a camera, a film take up spool, a reciprocable actuating member, operative driving connections between said member and said spool, means for arresting the rotation of the spool including a stop disc and a pawl engageable therewith, means on said actuating member for disengaging the pawl from the disc and spring means for retracting said actuating member.

23. Film winding mechanism including a take up roll, a spindle secured thereto, means for rotating the spindle, a stop disc, epicyclic gearing operatively connecting the spindle and disc and including gearing driven by said spindle and a fixed gear meshing with said gearing and a gear carried by said stop disc, and means engageable with said stop disc to arrest the rotation thereof.

24. Film winding mechanism including a take up roll, a spindle secured thereto, means for rotating the spindle, a stop disc, epicyclic gearing operatively connecting the spindle and disc and including gearing driven by said spindle and a fixed gear meshing with said gearing and a gear carried by said stop disc, and means engageable with said stop disc to arrest the rotation thereof, the gearing connection between the spindle and fixed gear differentiating from the gearing connection to the disc by at least one tooth.

25. In a camera, a take up spool, a spindle connected thereto, means for rotating the spindle, a member surrounding the spindle and driven thereby and means including a stop disc driven by said member for automatically arresting the rotation of the spindle.

26. In a camera, a film take up spool, means including an actuating member for rotating said spool, means including a notched stop disc for arresting the rotation of the spool when one exposure of film has been wound thereon, resilient means for retracting the actuating member, a pawl adapted to engage the notches in said disc and means operative upon the retraction of the actuating means for releasing the pawl from a notch in the disc.

27. In a camera, a film take up spool, means including an actuating member for rotating said spool, means including a notched stop disc for arresting the rotation of the spool when one exposure of film has been wound thereon, resilient means for retracting the actuating member, a pivoted pawl adapted to engage the notches in the disc and means operative upon the retraction of the actuating member for releasing the pawl from a notch in the disc and swinging the pawl about its pivot to inoperative position.

28. In a camera, a film take up spool, means including an actuating member for rotating said spool, means including a notched stop disc for arresting the rotation of the spool when one exposure of film has been wound thereon, a pawl slidably and pivotally mounted and having a lug adapted to engage the notches in said disc and means carried by said actuating member for disengaging the pawl lug from a notch in the disc and positioning said lug upon the periphery of said disc.

29. In a camera, a film take up spool, means including an actuating member for rotating said spool, means including a notched stop disc for arresting the rotation of the spool when one exposure of film has been wound thereon, resilient means for retracting said actuating member, a pawl slidably and pivotally mounted and having a lug adapted to engage the notches in said disc and means operative upon the retraction of said actuating member for retracting the pawl lug from a notch in the disc and swinging the pawl about its pivot thereby positioning the lug on the periphery of the disc and retaining the pawl in inoperative position.

30. In a camera, a film take up spool, means including an actuating member for rotating said spool, means including a notched stop disc for arresting the rotation of the spool when one exposure of film has been wound thereon, a pawl slidably and pivotally mounted and having a lug adapted to enter the notches of the disc, single means for moving the pawl lug into a notch and for swinging the pawl on its pivot and positioning the lug on the periphery of the disc when the lug is released from a notch and means for retracting the pawl and releasing the pawl lug from a notch in the disc.

31. In a camera, a film take up spool, means including an actuating member for rotating said spool, means including a notched stop disc for arresting the rotation of the spool when one exposure of film has been wound thereon, a pawl slidably and pivotally mounted and having a lug adapted to enter the notches of the disc, single resilient means for moving the pawl lug into a notch and for swinging the pawl on its pivot and positioning the lug on the periphery of the disc when the lug is released from a notch and means for retracting the pawl and releasing the pawl lug from a notch in the disc.

32. In a camera, a film take up spool, means including an actuating member for rotating said spool, means including a notched stop disc for arresting the rotation of the spool when one exposure of film has been wound thereon, a pawl slidably and pivotally mounted and having a lug adapted to enter the notches of the disc, single resilient means for moving the pawl lug into a notch and for swinging the pawl on its pivot and positioning the lug on the periphery of the disc when the lug is released from a notch and means carried by the actuating member for retracting the pawl and releasing the pawl lug from a notch in the disc.

33. In a camera, a film take up spool, means including a rack and pinion for rotating said spool, means including a notched stop disc for arresting the rotation of the spool when one exposure of film has been wound thereon, resilient means for retracting the rack, a pawl adapted to engage the notches in said disc and means operative upon the retraction of the rack for releasing the pawl from a notch in the disc.

34. In a camera, a film take up spool, a reciprocable rack, operative driving connections between said member and said spool, means for arresting the rotation of the spool including a stop disc and a pawl engageable therewith, means on said rack for disengaging the pawl from the disc and spring means for retracting said rack.

35. In a camera, a film take up spool, a reciprocable rack, operative driving connections between said member and said spool, means for arresting the rotation of the spool including a stop disc and a pawl engageable therewith, and means on said rack for disengaging the pawl from the disc.

36. In a camera, a film take up spool, a spindle operatively connected thereto, an eccentric surrounding the spindle, a stop disc for arresting the rotation of the spool, gearing connections between said eccentric and said stop disc and means including a rack and pinion for rotating said spindle.

37. Film winding mechanism including a take up spool, a spindle secured thereto, an eccentric mounted on said spindle, a stop disc for controlling the rotation of said spool, and an epicyclic gear train including a driving member mounted on said eccentric and a driven member mounted on the stop disc, said gear train being so constructed that there is a differentiation of at least one tooth between the driving and driven members of said gear train.

38. In a camera, a film take up spool, a spindle connected thereto, a pinion on said spindle, a rack for actuating said spindle, a stop disc for arresting the rotation of the spool and a pawl engageable with said disc.

39. Film winding mechanism including a take up roll, a spindle secured thereto, means for rotating the spindle, a stop disc, a driving member secured to the spindle, differential gearing carried by said driving member and comprising a pair of gears, a fixed gear meshing with one of said pair of gears and a gear carried by the disc and meshing with the other gear of said pair of gears, and means engageable with said disc at predetermined points in the rotation thereof for arresting the rotation of the disc.

40. In a camera, a film take up spool, a spindle connected thereto, a pinion mounted on said spindle, a gear member for actuating said spindle, a stop disc for arresting the rotation of the spool and a pawl engageable with said disc.

41. In a camera, a film take up spool, a gear member, operative driving connections between said member and said spool, means for arresting the rotation of the spool including a stop disc and a pawl engageable therewith, and means on said gear member for disengaging the pawl from the disc.

In witness whereof, I have hereunto set my hand this 20 day of March, 1922.

JAMES A. MAY.